United States Patent
Li et al.

(10) Patent No.: US 10,560,340 B2
(45) Date of Patent: Feb. 11, 2020

(54) METHOD AND APPARATUS FOR SELECTING POSITION OF ROUTING NODE AND TERMINAL EQUIPMENT

(71) Applicant: Fujitsu Limited, Kawasaki-shi, Kanagawa (JP)

(72) Inventors: Hongchun Li, Beijing (CN); Jun Tian, Beijing (CN); Chen Ao, Beijing (CN); Yi Xu, Beijing (CN)

(73) Assignee: FUJITSU LIMITED, Kanagawa (JP)

( * ) Notice: Subject to any disclaimer, the term of this patent is extended or adjusted under 35 U.S.C. 154(b) by 145 days.

(21) Appl. No.: 15/700,714

(22) Filed: Sep. 11, 2017

(65) Prior Publication Data

US 2018/0091379 A1   Mar. 29, 2018

(30) Foreign Application Priority Data

Sep. 23, 2016  (CN) .......................... 2016 1 0849521

(51) Int. Cl.
  *H04L 12/24* (2006.01)
  *H04L 12/26* (2006.01)
  *H04L 12/721* (2013.01)

(52) U.S. Cl.
  CPC ........ *H04L 41/145* (2013.01); *H04L 41/0816* (2013.01); *H04L 43/0811* (2013.01); *H04L 43/0882* (2013.01); *H04L 45/12* (2013.01)

(58) Field of Classification Search
  None
  See application file for complete search history.

(56) References Cited

U.S. PATENT DOCUMENTS

| 7,295,960 B2 | 11/2007 | Rappaport et al. |
| 2006/0056329 A1* | 3/2006 | Ookuma ............... H04B 7/155 370/315 |

(Continued)

FOREIGN PATENT DOCUMENTS

| CN | 104394537 | 3/2015 |
| CN | 104883702 | 9/2015 |
| WO | 2013/060299 | 5/2013 |

OTHER PUBLICATIONS

Extended European Search Report dated Dec. 1, 2017 in corresponding European Patent Application No. 17190670.4, 11 pages.

(Continued)

*Primary Examiner* — Ayaz R Sheikh
*Assistant Examiner* — Sori A Aga
(74) *Attorney, Agent, or Firm* — Staas & Halsey LLP

(57) ABSTRACT

A method and apparatus for selecting a position of a routing node and terminal equipment where the method includes: generating a connection relationship among sensor nodes, a gateway node and deployable routing nodes according to network deployment information and a link quality model related to a deployment environment; and calculating a shortest path from each sensor node to the gateway node according to the connection relationship, and determining deployable positions of routing nodes on the shortest path as positions of the routing nodes. With the embodiments of this disclosure, in selecting a position of a routing node, an effect of a deployment environment and limit of a deployment position are taken into account, thereby obtaining a routing node deployment scheme satisfying a practical environment and ensuring network data transmission performance.

9 Claims, 5 Drawing Sheets

(56) References Cited

U.S. PATENT DOCUMENTS

2013/0029587 A1* 1/2013 Gandhi ................ H04W 16/20
455/7
2014/0233401 A1 8/2014 Jiang et al.

OTHER PUBLICATIONS

European Office Action dated Feb. 25, 2019 in European Patent Application No. 17190670.4.
Abhijit Bhattacharya et al., "A shortest path tree based algorithm for relay placement in a wireless sensor network and its performance analysis," Computer Networks, vol. 71, Jun. 2014, 15 pages.
Lanny Sitanayah et al., "A fault-tolerant relay placement algorithm for ensuring k vertex-disjoint shortest paths in wireless sensor networks", Ad Hoc Networks, vol. 23, 2014, pp. 145-162.
Tp-Link: "Easy Wi-Fi Extension Flexible Placement", Jun. 2015, XP055556028, 39 pages, Retrieved from the Internet: URL:https://fccid.io/TE7RE450/User-Manual/User-Manual-2859706. pdf.
Chinese Journal of Computers, "Relay Deployment Algorithm in Heterogeneous Wireless Networks", Che Nan, Li Zhi-Jun, Jiagn Shou-Xu, vol. 39, No. 5, May 31, 2016 (14 pages).
"Deploying Sensor Networks With Guaranteed Capacity and Fault Tolerance", Jonathan L. Bredin, Erik D. Demaine, Mohammad Taghi Hajiaghayi, and Daniela Rus, Feb. 28, 2010 (13 pages).

\* cited by examiner

METHOD AND APPARATUS FOR SELECTING POSITION OF ROUTING NODE AND TERMINAL EQUIPMENT

CROSS-REFERENCE TO RELATED APPLICATIONS

This application claims the benefit of Chinese Application No. 201610849521.3, filed Sep. 23, 2016, in the Chinese Intellectual Property Office, the disclosure of which is incorporated herein by reference.

BACKGROUND

1. Field

This disclosure relates to the field of communication technologies, and in particular to a method and apparatus for selecting a position of a routing node and terminal equipment.

2. Description of the Related Art

As progress of communication technologies, wireless sensor networks have developed rapidly, not only bringing convenience to people's lives, but also changing styles of people's production and lives.

A wireless sensor network includes sensor nodes, routing nodes and a gateway node. In the wireless sensor network, the routing nodes constitute information exchange channels between the sensor nodes and the gateway node, which are important components of the network. After the sensor nodes finish data acquisition, they need to transmit the data to the gateway node. When the sensor nodes and the gateway node are unable to communicate directly, the routing nodes forward the data between them.

In practical network deployment, user selects types, numbers and positions of sensor nodes and gateway node according to particular application demands, and environmental limitations, etc. When a range of the network deployment is very large, distances between the sensor nodes and the gateway node exceed a communication radius, and a network is hard to be constituted directly, and at this moment, some routing nodes need to be deployed in the network. The routing nodes function to connect the sensor nodes and the gateway node, which decide efficiency and reliability of data transmission. And the number of the routing nodes in the network usually occupies a very large proportion of network cost, that is, a hardware cost, a deployment cost and a maintenance cost of the routing nodes are important components of the network cost. Hence, selection of positions of routing nodes has a large effect on performance and cost of a network.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY

Additional aspects and/or advantages will be set forth in part in the description which follows and, in part, will be apparent from the description, or may be learned by practice of the embodiments.

It was found by the inventor that in practical deployment of a network, selection of positions of routing nodes is greatly affected by the environment. Such factors in the deployment environment as vegetation, terrain, and building decide communication ranges and deployable positions of the routing nodes. For example, routing nodes have very large communication ranges on an open flat ground relative to dense trees. The larger the communication range, the sparse the deployment of the routing nodes, and vice versa. A practical deployment environment is very complex, a difference between costs of deployment at different positions is very large, and some positions are even undeployable positions.

Existing methods for selecting a position of a routing node usually do not take effects of the environment into account, and take reduction of the number of routing nodes as a single target. The positions of the routing nodes obtained in such a way are unable to ensure network performance, and is even unavailable in practical deployment. Embodiments of this disclosure provide a method and apparatus for selecting a position of a routing node and terminal equipment, in which in selecting a position of a routing node, an effect of a deployment environment and limit of a deployment position are taken into account, thereby obtaining a routing node deployment scheme satisfying a practical environment and ensuring network data transmission performance.

According to a first aspect of the embodiments of this disclosure, there is provided an apparatus for selecting a position of a routing node, including:

a generating module configured to generate a connection relationship among sensor nodes, a gateway node and deployable routing nodes according to network deployment information and a link quality model related to a deployment environment; and a first calculating module configured to calculate a shortest path from each sensor node to the gateway node according to the connection relationship, and determine deployable positions of routing nodes on the shortest path as positions of the routing nodes.

According to a second aspect of the embodiments of this disclosure, there is provided terminal equipment, including the apparatus as described in the first aspect.

According to a third aspect of the embodiments of this disclosure, there is provided a method for selecting a position of a routing node, including:

generating a connection relationship among sensor nodes, a gateway node and deployable routing nodes according to network deployment information and a link quality model related to a deployment environment; and calculating a shortest path from each sensor node to the gateway node according to the connection relationship, and determining deployable positions of routing nodes on the shortest path as positions of the routing nodes.

An advantage of the embodiments of this disclosure exists in that with the embodiments of this disclosure, in selecting a position of a routing node, an effect of a deployment environment and limit of a deployment position are taken into account, thereby obtaining a routing node deployment scheme satisfying a practical environment and ensuring network data transmission performance.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

For the sake of easy understanding, a problem of selection of a position of a routing node shall be explained first.

Figure 1:
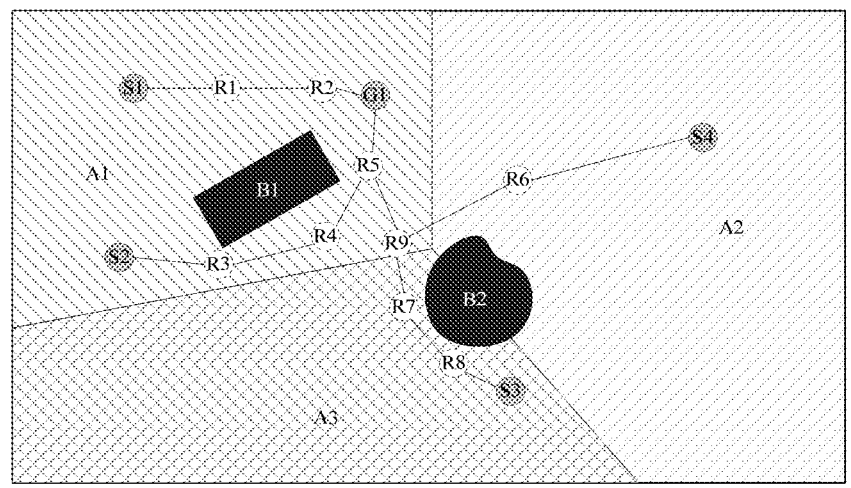
FIG. 1 is a schematic diagram of deployment of a wireless sensor network.

FIG. 1 is an example of deployment of a network, which is used to depict a problem of selection of a position of a routing node. The whole deployment area in FIG. 1 is divided into three areas according to different deployment environments, which are A1, A2 and A3. Nodes in different areas have different communication radii as being subjected to the environment. Communication ranges of nodes in area A1 are the largest, and communication ranges of nodes in area A3 are the smallest. In a deployment environment, there exist two undeployable areas, B1 and B2. In selecting a position of a routing node, the areas B1 and B2 should be avoided.

In FIG. 1, nodes S1, S2, S3 and S4 are sensor nodes, node G1 is a gateway node, and their positions are known. The problem of selection of a position of a routing node is to determine the number of routing nodes in a network and positions of the routing nodes, such that the sensor nodes are able to be connected to a specific or any gateway node via the routing nodes. FIG. 1 gives an example of a result of selection of a position of a routing node, in which there are nine routing nodes, R1-R9. The positions of the routing nodes are as shown in FIG. 1. The sensor nodes S1-S4 may be connected to the gateway node G1 via these routing nodes.

The embodiments of this disclosure shall be described below with reference to the accompanying drawings.

Embodiment 1

Figure 2:
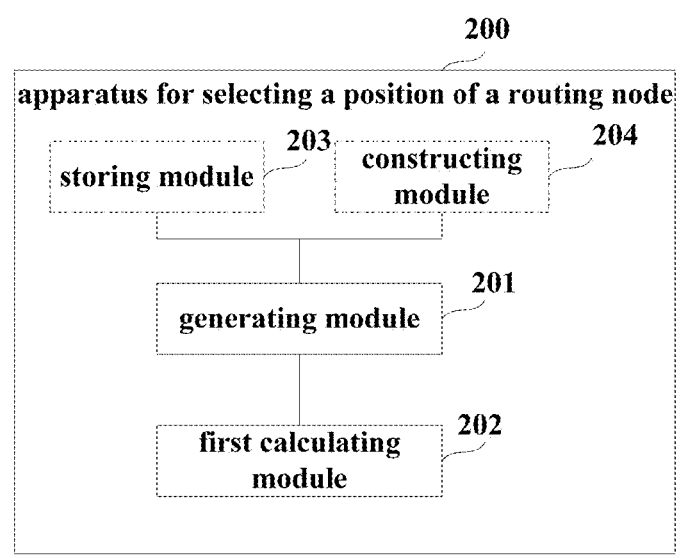
FIG. 2 is a schematic diagram of an apparatus for selecting a position of a routing node in Embodiment 1.

The embodiment of this disclosure provides an apparatus for selecting a position of a routing node. FIG. 2 is a schematic diagram of the apparatus. Referring to FIG. 2, the apparatus 200 includes a generating module 201 and a first calculating module 202. The generating module 201 is configured to generate a connection relationship among sensor nodes, a gateway node and deployable routing nodes according to network deployment information and a link quality model related to a deployment environment, and the first calculating module 202 is configured to calculate a shortest path from each sensor node to the gateway node according to the connection relationship, and determine deployable positions of routing nodes on the shortest path as positions of the routing nodes.

With the apparatus of this embodiment, in selecting a position of a routing node, an effect of a deployment environment and limit of a deployment position are taken into account, thereby obtaining a routing node deployment scheme satisfying a practical environment and ensuring network data transmission performance.

The components of the apparatus 200 for selecting a position of a routing node shall be described below respectively.

In this embodiment, in generating the connection relationship, the generating module 201 needs to take the network deployment information and the link quality model related to a deployment environment into account; wherein, the network deployment information includes: positions $P_S$ of the sensor nodes, a position $P_G$ of a gateway node and deployable positions $P_D$ of the routing nodes, in a network. $P_S=\{P_1^S, P_2^S, \ldots, P_m^S\}$; where, $P_i^S(1 \leq i \leq m$ is) is a deployment position of a sensor node Si. $P_G=\{P^G\}$; where, $P^G$ is a deployment position of a gateway node G. And $P_D=\{P_1^D, P_2^D, \ldots, P_M^D\}$; where, $P_i^D(1 \leq i \leq M)$ is a position of a deployable routing node.

The deployable positions of the routing nodes may be determined according to a practical deployment environment of a to-be-deployed area, that is, the deployable positions of the routing nodes are usually limited by the deployment environment, and when the to-be-deployed area contains an undeployable area, the deployable positions of the routing nodes are located in another area in the to-be-deployed area than the undeployable area; wherein, the other area may be discretized into several positions, which are taken as the deployable positions of the routing nodes. As shown in FIG. 1, in to-be-deployed areas A1, A2 and A3, there exist two undeployable areas B1 and B2. Hence, the deployable positions of the routing nodes are in other areas in the to-be-deployed areas A1, A2 and A3 than areas B1 and B2, and the deployable positions of the routing nodes are determined after the other areas are discretized.

In this embodiment, as shown in FIG. 2, the apparatus 200 may further include a storing module 203 (optional) configured to store the above network deployment information in advance.

In an actually deployed network, the quality of a link between a node and another node is greatly subjected to an environment. In this embodiment, communication quality of a radio link between two nodes at any two positions is given by the link quality model related to a deployment environment, wherein, the communication quality may be expressed by signal strength or packet reception rate; however, this embodiment is not limited thereto.

In this embodiment, as shown in FIG. 2, the apparatus 200 may further include a constructing module 204 (optional) configured to pre-construct the link quality model related to the deployment environment.

In this embodiment, the link quality model may be expressed as: $q=f(p_1,p_2,T_1,T_2)$; where, q denotes the communication quality of the radio link, $p_1$ and $p_2$ are respective positions of two nodes, and $T_1$ and $T_2$ are types of the nodes deployed at $p_1$ and $p_2$, which may be, for example, sensor nodes, or routing nodes, or gateway node. In this embodiment, after positions and types of any two nodes are determined, quality of a link between the two nodes may be obtained according to the link quality model. And furthermore, when the types of the nodes are different, their hardware structures may be different, and the communication quality of the radio link between the two nodes obtained according to the link quality model may also be different.

In this embodiment, the constructing module 204 may obtain the above link quality model by using a theoretical analysis or experimental measurement manner. How to obtain the above link quality model shall be described below taking the experimental measurement manner as an example; however, this embodiment is not limited thereto.

First, a to-be-deployed area may be divided into several sub-areas having identical link quality models according to, for example, a deployment environment. As shown in FIG. 1, the to-be-deployed area may be divided into three sub-areas, A1, A2 and A3, according to the deployment environment, link quality models used by nodes in each sub-area being identical, and link quality models used by different sub-areas being different. In constructing the link quality model of each sub-area, the constructing module 204 may place a transmission node and a reception node of different node types at any two positions in each sub-area; wherein, the transmission node $T_1$ periodically transmits signals, and the reception node $T_2$ receives the signals, and measures communication quality of a radio link from the transmission node $T_1$ to the reception node $T_2$, thereby obtaining the link quality model of the sub-area. As being subjected to the deployment environment, the link quality models of the sub-areas are different.

Figure 3:
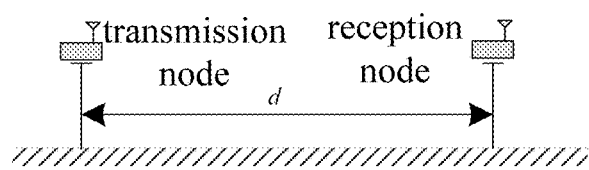
FIG. 3 is a schematic diagram of measuring a link quality model in Embodiment 1.

In an implementation, as an effect of a deployment environment of a sub-area on link quality is substantially identical, in order to simplify a link quality model, positions of any two nodes may be abstracted to be expressed by a distance between the nodes, that is, within the same sub-area, link quality is only related to types of nodes and a distance between the nodes, and is not related to particular positions of the nodes. FIG. 3 is a schematic diagram of experimentally measuring the link quality model in this embodiment. As shown in FIG. 3, by measuring quality of links between nodes of different distances, a correspondence relationship between distances, node types and corresponding link quality within a sub-area may be obtained and is taken as a link quality model, the correspondence relationship being expressed by Table 1 below:

TABLE 1

| Distance (d) | Type of transmission node | Type of reception node | Link quality |
|---|---|---|---|
| $d_1$ | $T_{11}$ | $T_{12}$ | $Q_1$ |
| ... | ... | ... | ... |
| $d_i$ | $T_{i1}$ | $T_{i2}$ | $Q_i$ |

What described above is illustrative only, the link quality model may also be expressed as other forms, and this embodiment is not limited thereto. In this embodiment, the correspondence relationship may also be pre-stored in the storing module 203, and this embodiment is not limited thereto.

With the embodiments of this disclosure, as an effect of a deployment environment is taken into account in determining the link quality, a routing node deployment scheme satisfying a practical environment and ensuring network data transmission performance may be obtained.

Figure 4:
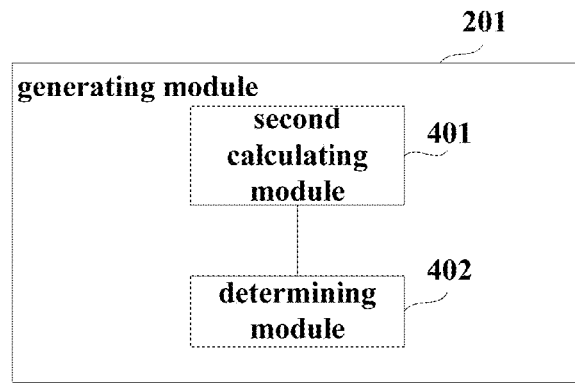
FIG. 4 is a schematic diagram of an example of a generating module in Embodiment 1.

FIG. 4 is a schematic diagram of an implementation of the generating module 201. As shown in FIG. 4, in this implementation, the generating module 201 includes a second calculating module 401 and a determining module 402. The second calculating module 401 calculates quality of a link between any two nodes among the sensor nodes, the gateway node and the deployable routing nodes according to the link quality model, and the determining module 402 determines that there exists a connection relationship between the two nodes when the quality of the link is greater than a predetermined threshold value of quality of link.

In this embodiment, the second calculating module 401 may determine positions of nodes (distances between nodes) and types of nodes by selecting any two nodes from the sensor nodes, the gateway node and the deployable routing nodes in the network deployment information, and then obtain quality of a link between the two nodes according to the link quality model (such as a pre-obtained correspondence relationship); the determining module 402 determines that there exists a connection relationship between the two nodes when the quality of the link is greater than a predetermined threshold value of quality of link; and the second calculating module 401 reselects two nodes and obtains quality of a link between the two reselected nodes according to the above operations, until quality of the link between any two of the sensor nodes, the gateway node and the deployable routing nodes and whether there exists a connection relationship between the any two nodes are determined. In this embodiment, the predetermined threshold value of quality of link may be set according to an actual situation, and this embodiment is not limited thereto.

In an implementation, the connection relationship may be expressed by a connection graph G=(V,E); where, V is a vertex set containing a set of deployment positions of sensor nodes, a set of a deployment position of the gateway node, and a set of deployment positions of the routing nodes, in a network, and E is a set of edges containing a set of two nodes having a connection relationship.

Figure 5:
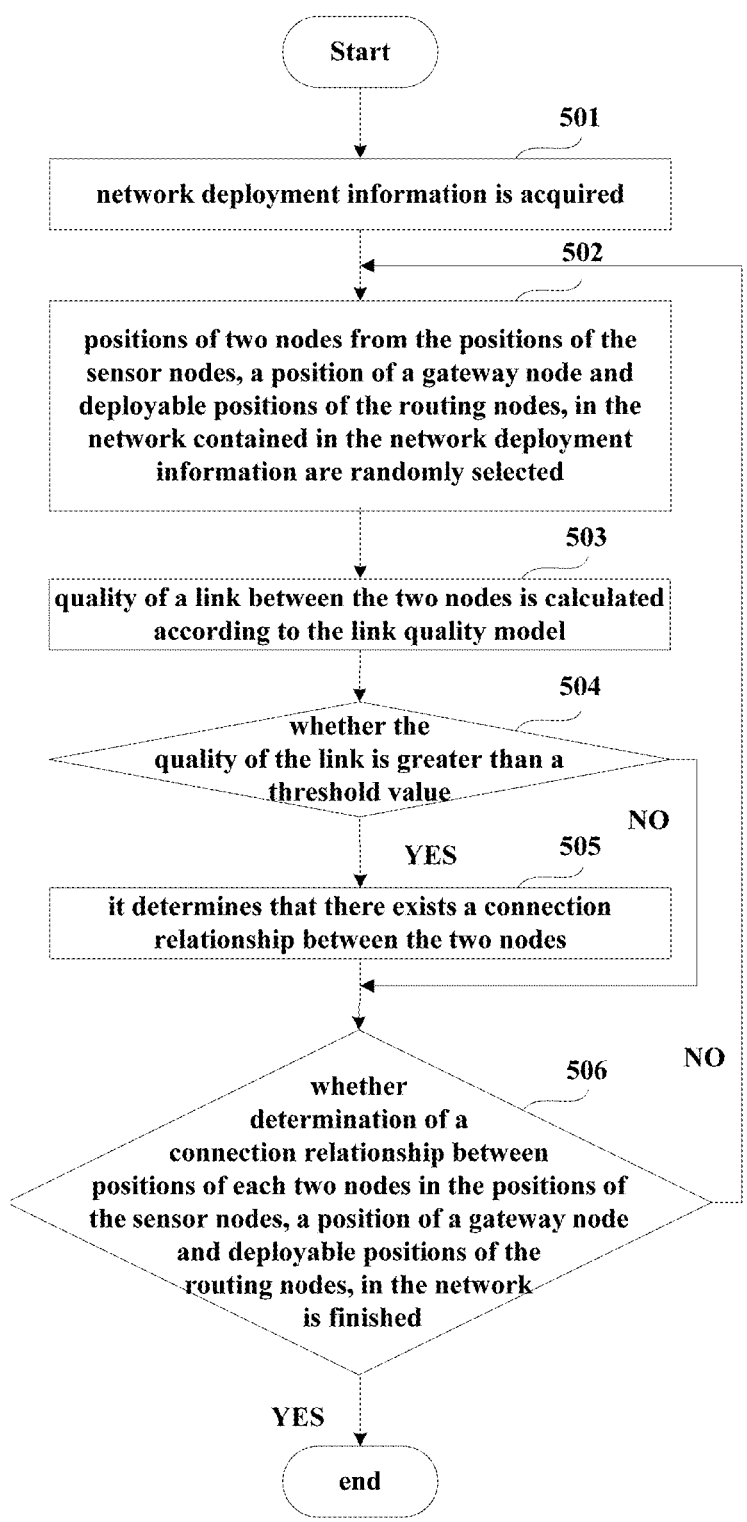
FIG. 5 is a flowchart of a method for generating a connection relationship in Embodiment 1.

FIG. 5 is a flowchart of a method for generating the connection relationship in this embodiment. As shown in FIG. 5, the method includes:

step 501: network deployment information is acquired;

step 502: positions of two nodes from the positions of the sensor nodes, a position of a gateway node and deployable positions of the routing nodes, in the network contained in the network deployment information are randomly selected;

step 503: quality of a link between the two nodes is calculated according to the link quality model;

step 504: whether the quality of the link is greater than a threshold value is judged, and step 505 is executed when it is judged yes, otherwise, step 506 is executed;

step 505: it is determined that there exists a connection relationship between the two nodes; and step 506: it is judged whether determination of a connection relationship between positions of each two nodes in the positions of the sensor nodes, a position of a gateway node and deployable positions of the routing nodes, in the network is finished, terminating operations is performed when it is judged yes, otherwise, step 502 is performed.

In step 501, the network deployment information, containing the positions of the sensor nodes, a position of a gateway node and deployable positions of the routing nodes, in the network, is first acquired from the storing module 203, so as to finish initialization of the connection graph G; wherein, G=(V,E); where, V is a set containing a set of deployment positions of sensor nodes, a set of the deployment position of the gateway node, and a set of deployment positions of the routing nodes, in a network, and E is initialized as an empty set.

In step 502, the generating module 201 randomly selects positions of two nodes $p_1$ and $p_2$ from V.

In step 503, the generating module 201 calculates quality q of a link between the nodes $p_1$ and $p_2$ according to the pre-constructed link quality model, the positions of the nodes $p_1$ and $p_2$ and types of the nodes $p_1$ and $p_2$.

In step 504, whether q is greater than the threshold value $Q_{th}$ is judged, and step 505 is executed when it is judged yes, otherwise, step 506 is executed.

In step 505, it is determined that there exists a connection relationship between the nodes $p_1$ and $p_2$, that is $(p_1, p_2)$ is added into the set E of edges.

In step 506, whether determination of a connection relationship between any two nodes in V is finished is judged, that is, whether steps 503-505 are executed for any two nodes in V, and the operations are terminated and the generating module 201 obtains the connection graph G when it is judged yes, otherwise, it is turned back to step 502, and two nodes are reselected from V, only if the reselected two nodes are not completely repeated with $p_1$ and $p_2$, thereby obtaining the connection relationship among the sensor nodes, the gateway node and the deployable routing nodes.

After the generating module 201 obtains the connection relationship, the first calculating module 202 calculates a shortest path from each sensor node to the gateway node according to the connection relationship, and determines deployable positions of routing nodes on the shortest path as positions of the routing nodes.

Figure 6:
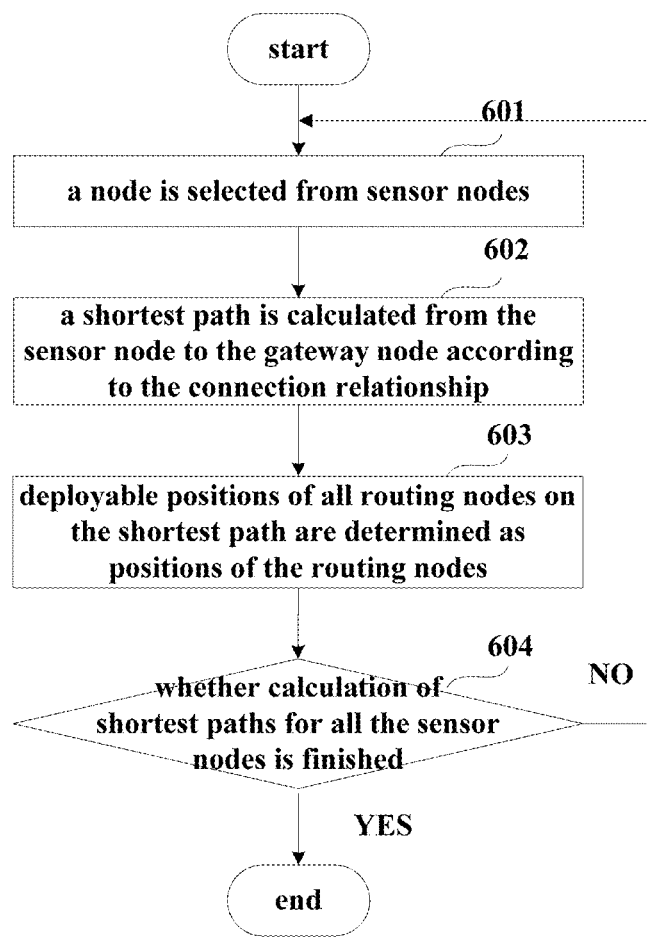
FIG. 6 is a flowchart of a method for determining a position of a routing node in Embodiment 1.

FIG. 6 is a flowchart of a calculation method of the first calculating module 202. As shown in FIG. 6, the method includes:

step 601: a node is selected from sensor nodes;

step 602: a shortest path is calculated from the sensor node selected in step 601 to the gateway node according to the connection relationship;

step 603: deployable positions of all routing nodes on the shortest path are determined as positions of the routing nodes; and step 604: it is judged whether calculation of shortest paths for all the sensor nodes is finished, operations are terminated and a finally determined set of positions of routing nodes is obtained when it is judged yes, otherwise, step 601 is executed, and a sensor node is reselected to calculate a shortest path, until deployable positions of routing nodes on shortest paths from all the sensor nodes to the gateway node are determined as the positions of the routing nodes.

Before step 601, the method may further include: the set $P_R$ of positions of routing nodes is initialized as being empty; and in step 601, a sensor node $p_i$ is selected from the set $P_S$ of positions of sensor nodes.

In 602, the shortest path from $p_i$ to the gateway node is calculated according to the connection graph G; wherein, a Floyd algorithm or a Dijkstra algorithm, for example, may be used to determine the shortest path H; however, this embodiment is not limited thereto, and a particular algorithm pertains to the related art, which shall not be described herein any further.

In 603, selectable positions of the routing nodes on the shortest path H are added into $P_R$.

In 604, it is judged whether steps 602-603 are executed for all nodes in $P_S$, and a final set $P_R$ of positions of routing nodes is obtained when it is judged yes, otherwise, it is turned back to step 601, and a sensor node $p_j$ is reselected from $P_S$, j≠i.

In this embodiment, the number of positions in $P_R$ is the number of routing nodes needing to be deployed.

With the apparatus of this embodiment, in selecting a position of a routing node, an effect of a deployment environment and limit of a deployment position are taken into account, thereby obtaining a routing node deployment scheme satisfying a practical environment and ensuring network data transmission performance.

Embodiment 2

The embodiment of this disclosure provides terminal equipment, including the apparatus for selecting a position of a routing node as described in Embodiment 1.

Figure 7:
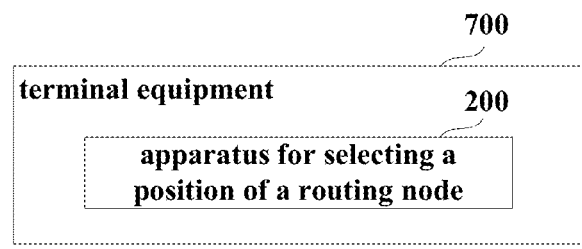
FIG. 7 is a schematic diagram of terminal equipment of Embodiment 2.

FIG. 7 is a schematic diagram of the terminal equipment. As shown in FIG. 7, the terminal equipment 700 includes an apparatus 200 for selecting a position of a routing node, the apparatus 200 being configured to: generate a connection relationship among sensor nodes, a gateway node and deployable routing nodes according to network deployment information and a link quality model related to a deployment environment; and calculate a shortest path from each sensor node to the gateway node according to the connection relationship, and determine deployable positions of routing nodes on the shortest path as positions of the routing nodes. As the apparatus 200 for selecting a position of a routing node has been described in detail in Embodiment 1, its contents are incorporated herein, and shall not be described herein any further.

Figure 8:
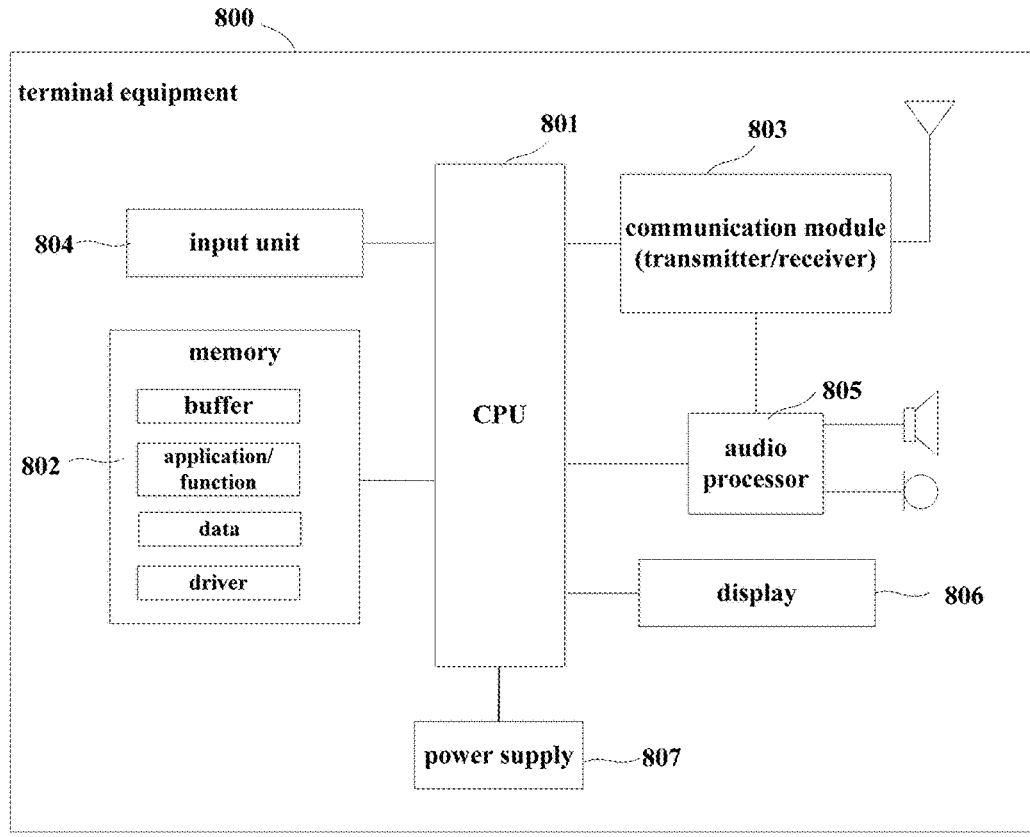
FIG. 8 is a schematic diagram of a systematic structure of the terminal equipment of Embodiment 2.

FIG. 8 is a block diagram of a systematic structure of the terminal equipment of this embodiment. As shown in FIG. 8, the terminal equipment 800 may include a central processing unit 801 and a memory 802, the memory 802 being coupled to the central processing unit 801. It should be noted that this figure is illustrative only, and other types of structures may also be used, so as to supplement or replace this structure and achieve a telecommunications function or other functions.

In an implementation, the functions of the apparatus 200 for selecting a position of a routing node described in Embodiment 1 may be integrated into the central processing unit 801. For example, the central processing unit 801 may be configured to: generate a connection relationship among sensor nodes, a gateway node and deployable routing nodes according to network deployment information and a link quality model related to a deployment environment; and calculate a shortest path from each sensor node to the gateway node according to the connection relationship, and determine deployable positions of routing nodes on the shortest path as positions of the routing nodes.

In another implementation, the apparatus 200 for selecting a position of a routing node described in Embodiment 1 and the central processing unit 801 may be configured separately. For example, the apparatus 200 may be configured as a chip connected to the central processing unit 801, with its functions being realized under control of the central processing unit 801.

As shown in FIG. 8, the terminal equipment 800 may further include a communication module 803, an input unit 804, an audio processor 805, a display 806 and a power supply 807. It should be noted that the terminal equipment 800 does not necessarily include all the parts shown in FIG. 8, and furthermore, the terminal equipment 800 may include parts not shown in FIG. 8, and the related art may be referred to.

As shown in FIG. 8, the central processing unit 801 is sometimes referred to as a controller or control, and may include a microprocessor or other processor devices and/or logic devices. The central processing unit 801 receives input and controls operations of every components of the terminal equipment 800.

In this embodiment, the memory 802 may be, for example, one or more of a buffer memory, a flash memory, a hard drive, a mobile medium, a volatile memory, a nonvolatile memory, or other suitable devices, which may store the above network deployment information, and may further store a program executing related information. And the central processing unit 801 may execute the program stored in the memory 802, so as to realize information storage or processing, etc. Functions of other parts are similar to those of the prior art, which shall not be described herein any further. The parts of the terminal equipment 800 may be realized by specific hardware, firmware, software, or any combination thereof, without departing from the scope of the present disclosure.

With the terminal equipment of this embodiment, in selecting a position of a routing node, an effect of a deployment environment and limit of a deployment position are taken into account, thereby obtaining a routing node deployment scheme satisfying a practical environment and ensuring network data transmission performance.

Embodiment 3

The embodiment of this disclosure provides a method for selecting a position of a routing node. As principles of the method for solving problems are similar to that of the apparatus in Embodiment 1, the implementation of the apparatus in Embodiment 1 may be referred to for implementation of the method, with identical contents being not going to be described herein any further.

Figure 9:
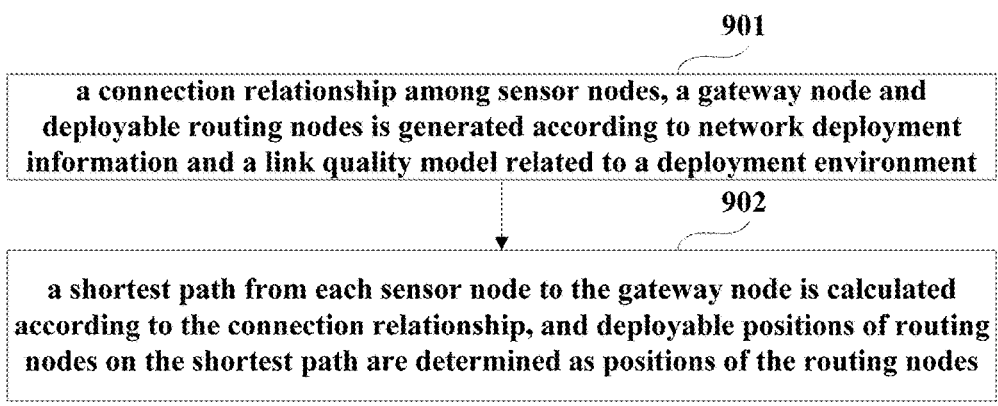
FIG. 9 is a flowchart of a method for selecting a position of a routing node of Embodiment 3.

FIG. 9 is a flowchart of an implementation of the method for selecting a position of a routing node of this embodiment. Referring to FIG. 9, the method includes:

step 901: a connection relationship among sensor nodes, a gateway node and deployable routing nodes is generated according to network deployment information and a link quality model related to a deployment environment; and step 902: a shortest path from each sensor node to the gateway node is calculated according to the connection relationship, and deployable positions of routing nodes on the shortest path are determined as positions of the routing nodes.

In this embodiment, the network deployment information includes: positions of the sensor nodes, a position of a gateway node and deployable positions of the routing nodes, in a network.

In this embodiment, the method may further include (not shown):

the link quality model related to the deployment environment is constructed; and wherein, quality of a link between two nodes at any two positions in the deployment environment may be determined by the link quality model.

In this embodiment, the link quality indicates communication quality of a radio link, which is expressed by a signal strength or a packet reception rate, etc.

In this embodiment, step 901 may further include:

quality of a link between any two nodes among the sensor nodes, the gateway node and the deployable routing nodes is calculated according to the link quality model; and it is determined that there exists a connection relationship between the two nodes when the quality of the link is greater than a predetermined threshold value of quality of link.

In this embodiment, the link quality model may be expressed as: $q=f(p_1,p_2,T_1,T_2)$; where, q denotes the link quality, $p_1$ and $p_2$ denote positions of any two nodes, and $T_1$ and $T_2$ denote types of any two nodes.

In this embodiment, the connection relationship may be expressed by a connection graph $G=(V,E)$; where, V is a vertex set containing a set of deployment positions of sensor nodes, a set of a deployment position of the gateway node, and a set of deployment positions of the routing nodes, in a network, and E is a set of edges containing a set of two nodes having a connection relationship.

With the method of this embodiment, in selecting a position of a routing node, an effect of a deployment environment and limit of a deployment position are taken into account, thereby obtaining a routing node deployment scheme satisfying a practical environment and ensuring network data transmission performance.

An embodiment of the present disclosure provides a computer readable program code, which, when executed in terminal equipment, will cause a computer unit to carry out the method described in Embodiment 3 in the terminal equipment.

An embodiment of the present disclosure provides a computer readable medium, including a computer readable program code, which will cause a computer unit to carry out the method described in Embodiment 3 in terminal equipment.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a non-transitory computer readable storage medium for storing the above program/method, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

For implementations of the present disclosure containing the above embodiments, following supplements are further disclosed.

Supplement 1. An apparatus for selecting a position of a routing node, including:
a generating module configured to generate a connection relationship among sensor nodes, a gateway node and deployable routing nodes according to network deployment information and a link quality model related to a deployment environment; and
a first calculating module configured to calculate a shortest path from each sensor node to the gateway node according to the connection relationship, and determine deployable positions of routing nodes on the shortest path as positions of the routing nodes.

Supplement 2. The apparatus according to supplement 1, wherein the apparatus further includes:
a storing module configured to store the network deployment information; and wherein, the network deployment information includes: positions of the sensor nodes, a position of a gateway node and deployable positions of the routing nodes, in a network.

Supplement 3. The apparatus according to supplement 1, wherein the apparatus further includes:
a constructing module configured to construct the link quality model related to the deployment environment; and wherein, quality of a link between two nodes at any two positions in the deployment environment is determined by the link quality model.

Supplement 4. The apparatus according to supplement 1, wherein the generating module includes:
a second calculating module configured to calculate quality of a link between any two nodes among the sensor nodes, the gateway node and the deployable routing nodes according to the link quality model; and
a determining module configured to determine that there exists a connection relationship between the two nodes when the quality of the link is greater than a predetermined threshold value of quality of link.

Supplement 5. The apparatus according to supplement 4, wherein the link quality model is expressed as: $q=f(p_1,p_2,T_1,T_2)$; where, q denotes the quality of the link, $p_1$ and $P_2$ denote positions of any two nodes, and $T_1$ and $T_2$ denote types of any two nodes.

Supplement 6. The apparatus according to supplement 4, wherein the quality of the link indicates communication quality of a radio link, which is expressed by a signal strength or a packet reception rate.

Supplement 7. The apparatus according to supplement 1, wherein the connection relationship is expressed by a connection graph $G=(V,E)$; where, V is a vertex set containing a set of deployment positions of sensor nodes, a set of a deployment position of the gateway node, and a set of deployment positions of the routing nodes, in a network, and E is a set of edges containing a set of two nodes having a connection relationship.

Supplement 8. Terminal equipment, including the apparatus as described in supplement 1.

Supplement 9. A method for selecting a position of a routing node, including:
generating a connection relationship among sensor nodes, a gateway node and deployable routing nodes according to network deployment information and a link quality model related to a deployment environment; and
calculating a shortest path from each sensor node to the gateway node according to the connection relationship, and determining deployable positions of routing nodes on the shortest path as positions of the routing nodes.

Supplement 10. The method according to supplement 9, wherein the generating a connection relationship among sensor nodes, a gateway node and deployable routing nodes according to network deployment information and a link quality model related to a deployment environment, includes:
calculating quality of a link between any two nodes among the sensor nodes, the gateway node and the deployable routing nodes according to the link quality model; and
determining that there exists a connection relationship between the two nodes when the quality of the link is greater than a predetermined threshold value of quality of link.

Supplement 11. The method according to supplement 9, wherein the method further includes:
storing the network deployment information; and wherein, the network deployment information comprises: positions of the sensor nodes, a position of a gateway node and deployable positions of the routing nodes, in a network.

Supplement 12. The method according to supplement 9, wherein the method further includes:
constructing the link quality model related to the deployment environment; and wherein, quality of a link between two nodes at any two positions in the deployment environment is determined by the link quality model.

Supplement 13. The method according to supplement 10, wherein the link quality model is expressed as: $q=f(p_1,p_2,T_1,T_2)$; where, q denotes the quality of the link, $p_1$ and $p_2$ denote positions of any two nodes, and $T_1$ and $T_2$ denote types of any two nodes.

Supplement 14. The method according to supplement 10, wherein the quality of the link indicates communication quality of a radio link, which is expressed by a signal strength or a packet reception rate.

Supplement 15. The method according to supplement 9, wherein the connection relationship is expressed by a connection graph $G=(V,E)$; where, V is a vertex set containing a set of deployment positions of sensor nodes, a set of deployment positions of the gateway node, and a set of deployment positions of the routing nodes, in a network, and E is a set of edges containing a set of two nodes having a connection relationship.

What is claimed is:
1. An apparatus for selecting a position of a routing node, comprising:
a processor including:
a generating module configured to generate a connection relationship among sensor nodes, a gateway node and deployable routing nodes according to network deployment information and a link quality model related to a deployment environment; and
a first calculating module configured to calculate a shortest path from each sensor node to the gateway node according to the connection relationship, and determine deployable positions of the routing nodes on the shortest path as node positions of the routing nodes;

wherein the processor further includes:
  a constructing module configured to construct the link quality model related to the deployment environment; and wherein, a quality of a link between two nodes at any two positions in the deployment environment is determined by the link quality model,
wherein the generating module includes:
  a second calculating module configured to calculate a quality of a link between any two nodes among the sensor nodes, the gateway node and the deployable routing nodes according to the link quality model; and
  a determining module configured to determine that a connection relationship exists between the two nodes when the quality of the link is greater than a predetermined threshold value of the quality of the link;
wherein the link quality model is expressed as: $q=f(p_1, p_2, T_1, T_2)$; where, q denotes the quality of the link, $p_1$ and $p_2$ denote positions of the any two nodes, and $T_1$ and $T_2$ denote types of any two nodes.

2. The apparatus according to claim 1, wherein the apparatus further includes:
  a memory configured to store the network deployment information; and
  wherein, the network deployment information includes: positions of the sensor nodes, a position of a gateway node and the deployable positions of the routing nodes, in a network.

3. The apparatus according to claim 1, wherein the quality of the link indicates communication quality of a radio link, which is expressed by one of a signal strength and a packet reception rate.

4. The apparatus according to claim 1, wherein the connection relationship is expressed by a connection graph G=(V,E); where, V is a vertex set containing a set of deployment positions of sensor nodes, a set of a deployment position of the gateway node, and a set of deployment positions of the routing nodes, in a network, and E is a set of edges containing a set of two nodes having the connection relationship.

5. Terminal equipment, including the apparatus as described in claim 1.

6. A method for selecting a position of a routing node, including:
  generating a connection relationship among sensor nodes, a gateway node and deployable routing nodes according to network deployment information and a link quality model related to a deployment environment; and
  calculating a shortest path from each sensor node to the gateway node according to the connection relationship, and determining deployable positions of the routing nodes on the shortest path as node positions of the routing nodes,
wherein the generating a connection relationship among sensor nodes, a gateway node and deployable routing nodes according to network deployment information and a link quality model related to a deployment environment, includes:
  calculating a quality of a link between any two nodes among the sensor nodes, the gateway node and the deployable routing nodes according to the link quality model; and
  determining that a connection relationship exists between the two nodes when the quality of the link is greater than a predetermined threshold value of the quality of the link,
wherein the link quality model is expressed as: $q=f(p_1, p_2, T_1, T_2)$; where, q denotes the quality of the link, $p_1$ and $p_2$ denote positions of the any two nodes, and $T_1$ and $T_2$ denote types of any two nodes;
wherein the method further includes:
  constructing the link quality model related to the deployment environment; and wherein, quality of a link between two nodes at any two positions in the deployment environment is determined by the link quality model.

7. The method according to claim 6, wherein the method further includes:
  storing the network deployment information; and
  wherein, the network deployment information comprises: positions of the sensor nodes, a position of a gateway node and the deployable positions of the routing nodes, in a network.

8. The method according to claim 6, wherein the quality of the link indicates communication quality of a radio link, which is expressed by one of a signal strength and a packet reception rate.

9. The method according to claim 6, wherein the connection relationship is expressed by a connection graph G=(V, E); where, V is a vertex set containing a set of deployment positions of sensor nodes, a set of deployment positions of the gateway node, and a set of deployment positions of the routing nodes, in a network, and E is a set of edges containing a set of two nodes having the connection relationship.

* * * * *